(12) United States Patent
Furcatte et al.

(10) Patent No.: US 12,742,664 B2
(45) Date of Patent: Sep. 22, 2026

(54) TEMPERATURE-STABILIZED OPTO-MECHANICAL OSCILLATOR

(71) Applicant: Commissariat à l'Energie Atomique et aux Energies Alternatives, Paris (FR)

(72) Inventors: Thomas Furcatte, Grenoble Cedex (FR); Marc Sansa Perna, Grenoble Cedex (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 19/000,387

(22) Filed: Dec. 23, 2024

(65) Prior Publication Data

US 2025/0207953 A1 Jun. 26, 2025

(30) Foreign Application Priority Data

Dec. 23, 2023 (FR) ...................................... 2315254

(51) Int. Cl.
*G01D 5/353* (2006.01)

(52) U.S. Cl.
CPC ................................ *G01D 5/35306* (2013.01)

(58) Field of Classification Search
CPC ....... G01D 5/35306; H03B 5/04; H03B 17/00
See application file for complete search history.

(56) References Cited

U.S. PATENT DOCUMENTS

2012/0327497 A1* 12/2012 Matsko ................ G02F 1/0123 359/239
2013/0003766 A1* 1/2013 Savchenkov ........... H01S 5/142 372/32

(Continued)

FOREIGN PATENT DOCUMENTS

EP 3 698 465 B1 9/2021

OTHER PUBLICATIONS

French Preliminary Search Report & Written Opinion Issued Sep. 18, 2024 in French Application 2315254 filed on Dec. 23, 2024 (with English Translation of Categories of Cited Documents), 11 pages.

(Continued)

*Primary Examiner* — Seung C Sohn
(74) *Attorney, Agent, or Firm* — Oblon, McClelland, Maier & Neustadt, L.L.P.

(57) ABSTRACT

An opto-mechanical oscillator, including a first laser light source, emitting a first light beam ($F_1$) at a first wavelength ($\lambda_1$); a resonator configured to oscillate at a resonant frequency ($f_r$), the resonator being optically coupled to the first light beam so that the resonator collects a fraction of the light propagating in the first beam, the fraction of light being modulated at the resonant frequency; a processing circuit, configured to: receive, as input, the first light beam having propagated along the resonator; generate a feedback signal (Sr) intended to be fed to the resonator; form, by way of output, an output signal ($S_{out}$) that is amplitude modulated, at a stabilized modulation frequency.

16 Claims, 7 Drawing Sheets

(56) References Cited

U.S. PATENT DOCUMENTS

| | | | |
|---|---|---|---|
| 2017/0314973 | A1 | 11/2017 | Leoncino et al. |
| 2021/0058033 | A1 | 2/2021 | Dolfi et al. |

OTHER PUBLICATIONS

Haitan Xu, et al., "Ultra-sensitive chip-based photonic temperature sensor using ring resonator structures", Optics Express, vol. 22, No. 3, 2014, 7 pages.

E. Gavartin, et al., "Stabilization of a linear nanomechanical oscillator to its ultimate thermodynamic limit", arXiv:1212.3358v1 [cond-mat.mes-hall], 2012, 17 pages.

* cited by examiner $\lambda_1$
$\lambda$
$P = P_0 + \alpha\cos(\omega_r t)$
$P_0$
$\Delta\lambda$ $\Delta\lambda$
$\lambda_1$
$P_0 + \Delta P_0$
$\Delta P_0$
$P_0$
$\Delta\lambda(T)$
$\Delta\lambda\ (T + \Delta T)$ 40
44
42
40'
Sc
46
11
$40_s$
$F'_{12}$
Sd
$F'_{11}$
20
21
$F_1$
$F'_1$
41
22
43
$40_{out}$
$S_{out}$
30
Sr
35

40
48
44
Sc
42
11
$F'_{12}$
$40_s$
$F'_{11}$
40'
Sd
$40_{out}$
20
$F_1$
$F'_1$
41
43
$S_{out}$
30
Sr
35

40
48
40'
42
44
Sc
11
40s
F'12
F'1
40out
Sd
20
F1
F'1
41
43
Sout
Sr
30
35
36

40
44
Sc
46
Sd
40'
11
43
40out
Sout
20
F1
F'1
Sr
30
35

TEMPERATURE-STABILIZED OPTO-MECHANICAL OSCILLATOR

TECHNICAL FIELD

The technical field of the invention is that of opto-mechanical oscillators.

PRIOR ART

Use of an opto-mechanical oscillator allows a periodic electronic signal to be formed, the amplitude and period of which are controlled. One possible application is the formation of a clock signal.

In prior-art devices, opto-mechanical oscillators comprise a mechanically oscillating structure optically coupled to a light beam. Under the effect of the optical coupling, some of the light propagating through the waveguide is mechanically extracted. Under the effect of the mechanical oscillation, at a resonant frequency, the efficiency of the optical coupling varies at the resonant frequency. A periodic variation in the amount of light propagating through the waveguide results.

The publication Xu et al "Ultra-sensitive chip-based photonic temperature sensor using ring resonator structures" describes an optical cavity coupled to a straight waveguide. The cavity is ring-shaped. It is optically coupled to the straight waveguide by evanescent coupling. Under the effect of a temperature variation, the wavelength of optical resonance is modified. Thus, an increase in temperature leads to an increase in the resonant wavelength. The beam propagating through the straight waveguide is a probe beam. Fluctuations in the luminous power transmitted by the probe beam, which depend on the resonant frequency, are used to determine the temperature variation of the resonant structure. The device described in the above publication thus forms a photonic thermometer.

The publication Lee et al "Low jitter and temperature stable MEMS oscillators" describes an electromechanical oscillator comprising a thermistor for measuring the temperature of an oscillating structure. The temperature delivered by the thermistor is used to electronically correct a signal modulated by the oscillating structure. However, the thermistor is separate from the oscillating structure: the temperature that it measures may be different from the temperature within the oscillating structure itself.

The publication Huang et al. 2017. "Direct stabilization of opto-mechanical oscillators" describes an opto-mechanical oscillator operating in a regime in which a change in temperature perturbs the frequency of mechanical resonance, but also modifies the amplitude of oscillation. The oscillator is servo-controlled by keeping the amplitude of oscillation constant, this indirectly having an effect on stability in the frequency domain.

The publication Gavartin 2013 "Stabilization of a linear nanomechanical oscillator to its thermodynamic limit" describes a resonator operating at two different mechanical frequencies. The actuation is said to be multi-mode. The frequency drift of a first mode is used to compensate for the frequency drift of the second mode. Nevertheless, this alternative is possible only if other ultra-stable oscillators are employed. This configuration is conceivable for sensor applications, but not for time bases.

The inventors provide an opto-mechanical oscillator allowing better account to be taken of temperature variations. The objective may be to generate an amplitude-modulated signal, the power and period of which are stable.

SUMMARY OF THE INVENTION

One subject of the invention is an opto-mechanical oscillator, comprising:

- a first laser light source, emitting a first light beam at a first wavelength;
- a resonator configured to oscillate at a resonant frequency, the resonator being configured to be optically coupled to the first light beam, in a first coupling passband containing the first wavelength, so that the resonator collects a fraction of the light propagating in the first beam, said fraction of light being modulated at the resonant frequency;
- a processing circuit, configured to:
  - receive, as input, the first light beam having propagated along the resonator;
  - generate a feedback signal intended to be fed to the resonator;
  - form, by way of output, an output signal that is amplitude modulated, at a modulation frequency corresponding to the resonant frequency;

the oscillator being characterized in that the processing circuit comprises:

- a photodetection circuit, forming the input of the processing circuit, and configured to detect at least a first part of the first light beam so as to form a detection signal that is frequency modulated at the resonant frequency, the processing circuit being configured to form the output signal depending on the detection signal;
- a low-pass filter, connected to the photodetection circuit and configured to form a correction signal, at a frequency lower than the resonant frequency, the correction signal being representative of a temperature variation of the resonator;
- a corrector, connected to the low-pass filter and configured to correct the modulation frequency of the detection signal depending on the correction signal.

According to one embodiment, the photodetection circuit comprises a first photodetector, connected to:

- a detection branch, carrying the detection signal;
- a correction branch, comprising the low-pass filter and the corrector.

According to one embodiment, the photodetection circuit comprises:

- a first photodetector, opening onto a detection branch carrying the detection signal;
- a second detector, opening onto a correction branch, the correction branch comprising the low-pass filter and the corrector.

The corrector may be configured to apply the correction signal:

- to the detection signal resulting from the first photodetector;
- or to the resonator;
- or to the first light source.

According to one possibility, the corrector is configured to:

- estimate a variation in the resonant frequency as a function of the correction signal;
- correct a frequency of the detection signal resulting from the first photodetector, depending on the variation of the estimated resonant frequency.

The corrector may be configured to apply a response function to the correction signal, to estimate the variation in resonant frequency.

According to one possibility, the corrector is connected to the first laser light source, so as to modify an emission power of the first light beam depending on the correction signal.

According to one possibility, the corrector is connected to the resonator, so as to modify the resonant frequency depending on the correction signal.

According to one possibility, the resonator comprises a regulating unit configured to be fed by the corrector, so as to adjust the resonant frequency via a thermal or electrostatic effect.

According to one possibility, the second photodetector is configured to detect a second part of the first light beam having propagated through the waveguide.

According to one possibility, the waveguide is configured to receive the first light beam and to propagate the latter along the resonator to the processing circuit.

According to one possibility, the oscillator comprises:

- a second laser light source, emitting a second light beam at a second wavelength, different from the first wavelength, the oscillator being such that:
- the processing circuit is configured to receive the second laser beam propagating along the resonator;
- the second wavelength lies in a second coupling passband of the resonator, so that the resonator collects a fraction of the light propagating in the second beam, said fraction of light being modulated at the resonant frequency;
- the second photodetector is configured to detect all or part of the second light beam having propagated along the resonator, so that the correction signal is established on the basis of a low-frequency component of the second light beam.

The processing circuit may comprise a splitter configured to:

- direct all or part of the first beam to the first photodetector;
- direct all or part of the second beam to the second photodetector.

The oscillator may comprise:

- an optical channel, extending between the second light source and the processing circuit, the optical channel being configured to convey part of the second light beam from the light source to the processing circuit;
- an interferometer, configured to form an interference signal between:
  - the second beam having propagated along the resonator;
  - the part of the second light beam emerging from the optical channel;
- the processing circuit being such that the second photodetector is configured to detect the interference signal resulting from the interferometer.

The waveguide may be configured to receive the second light beam and to propagate the latter along the resonator to the processing circuit.

The oscillator may possibly comprise a high-pass filter, placed between the first photodetector and the resonator, and the cut-off frequency of which is lower than or equal to the resonant frequency.

The invention will be better understood on reading the description of the examples of embodiment presented, in the remainder of the description, with reference to the figures listed below.

FIGURES

FIG. 1A and FIG. 1B schematically show a waveguide and an opto-mechanical resonator, forming an opto-mechanical oscillator.

Figures 3A, 3B:
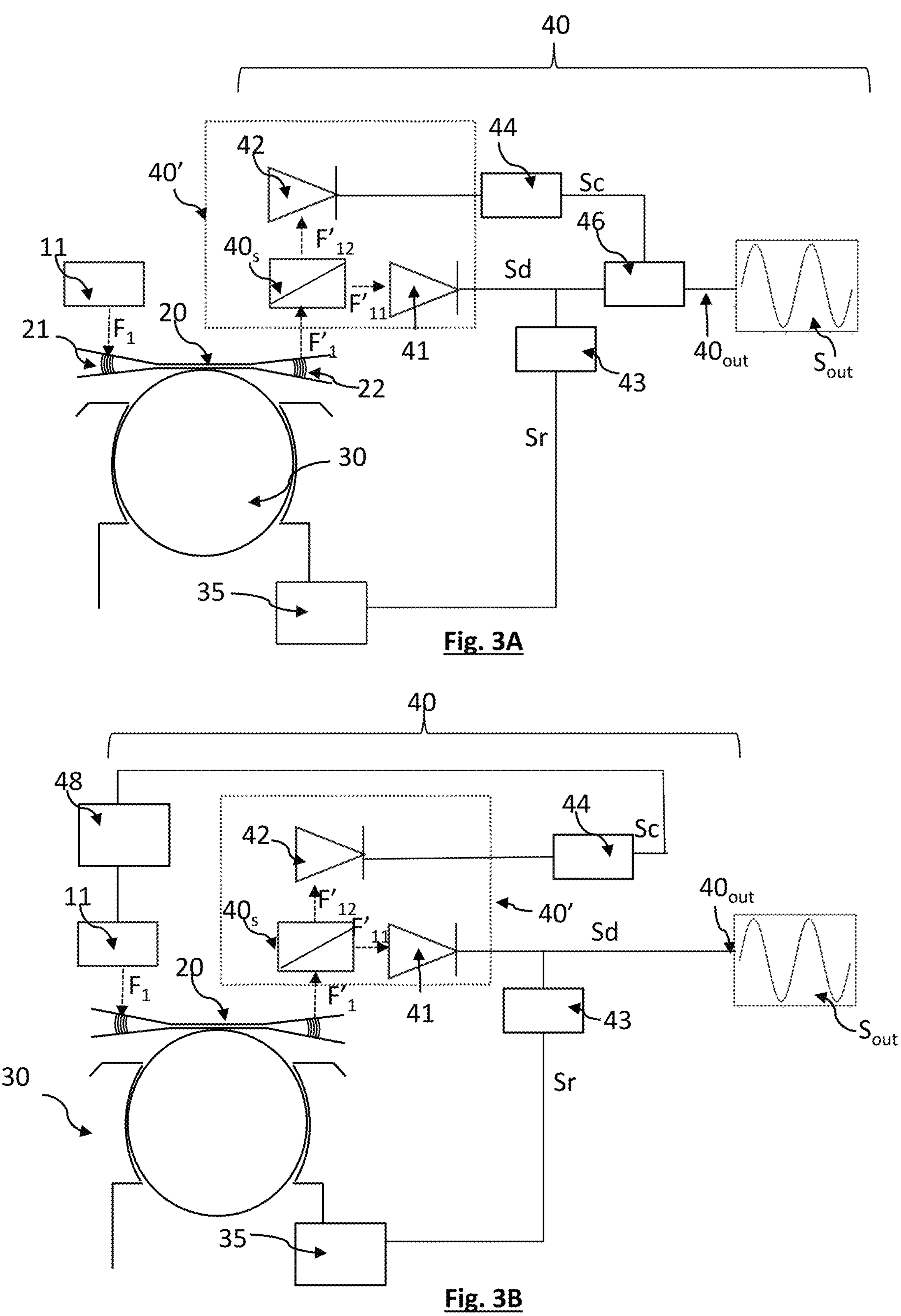

FIG. 3A schematically shows a first embodiment of the invention.

FIG. 3B schematically shows one variant of the first embodiment of the invention.

Figures 3C, 3D:
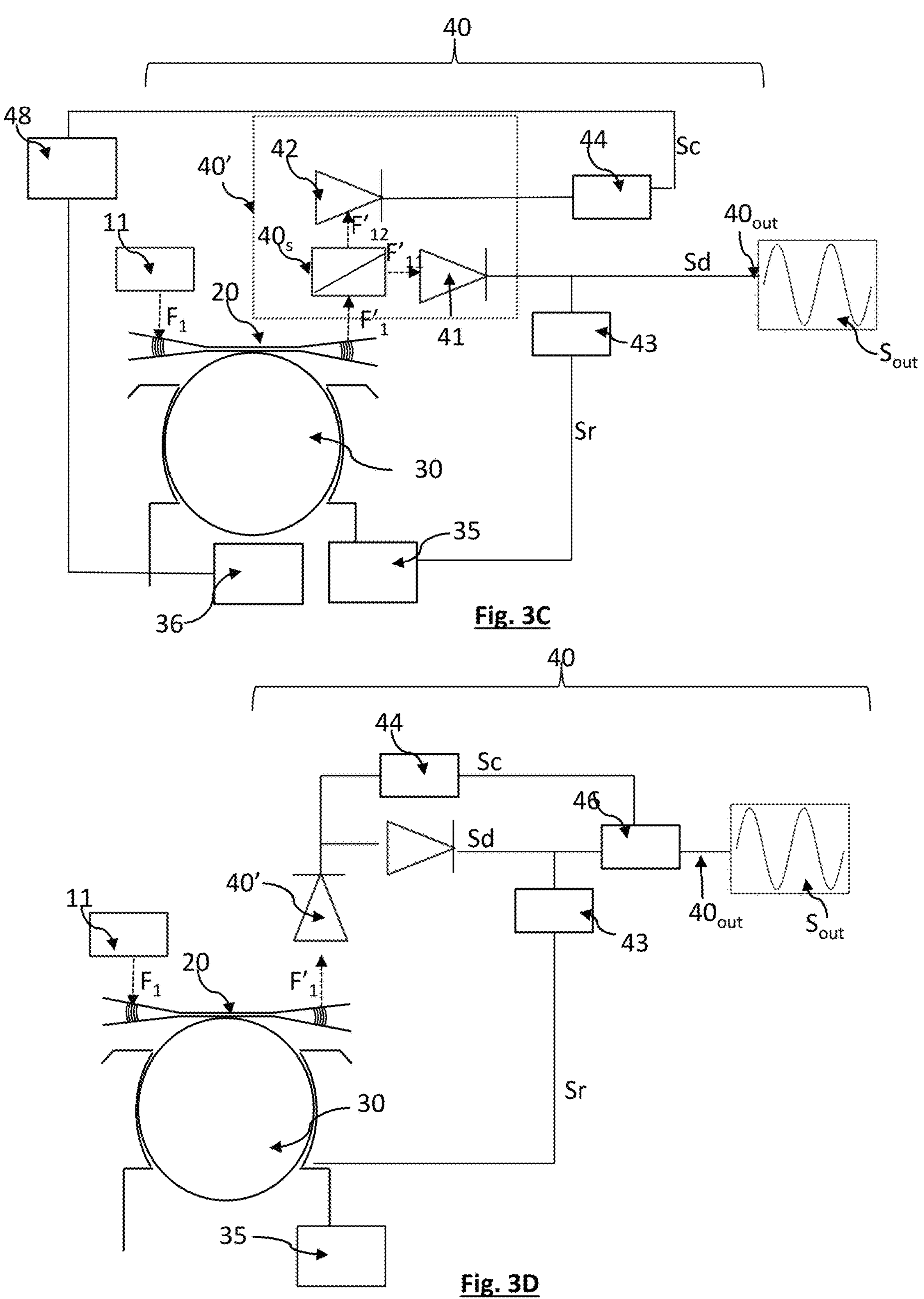

FIG. 3C schematically shows another variant of the first embodiment of the invention.

FIG. 3D shows another variant of the first embodiment of the invention.

Figure 4:
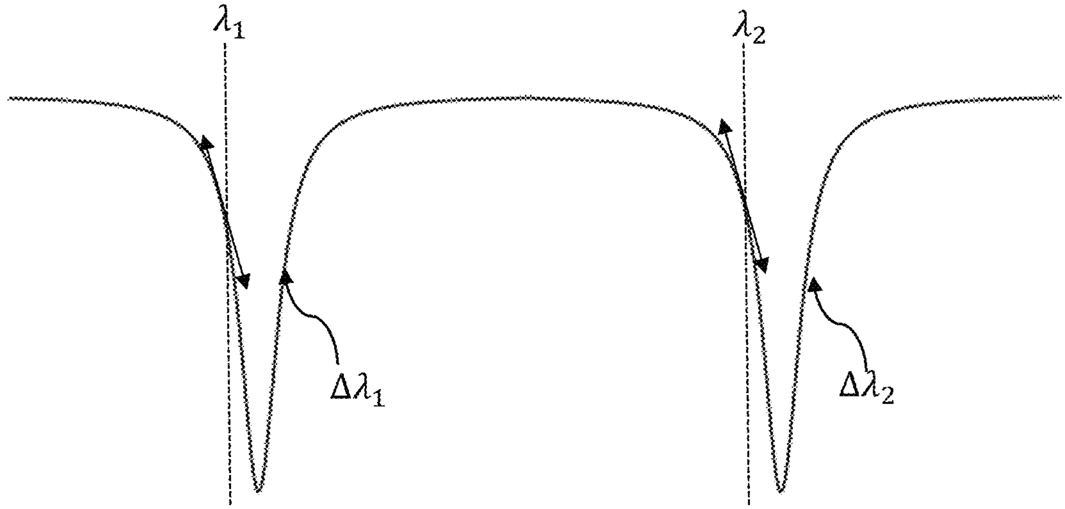

FIG. 4 illustrates two optical coupling passbands addressed by two different wavelengths.

Figures 5A, 5B:
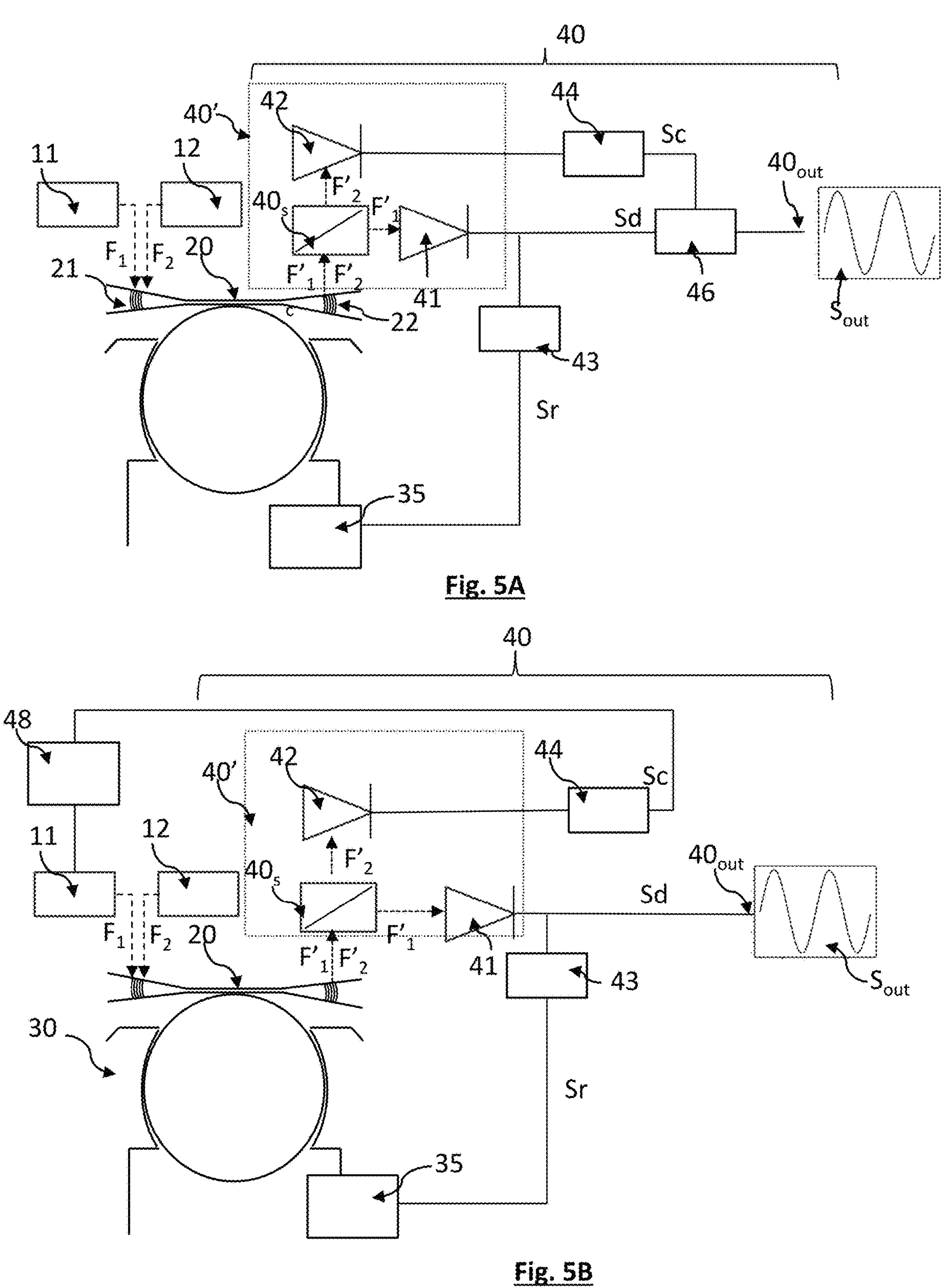

FIG. 5A schematically shows a second embodiment of the invention.

FIG. 5B schematically shows one variant of the second embodiment of the invention.

Figures 5C, 5D:
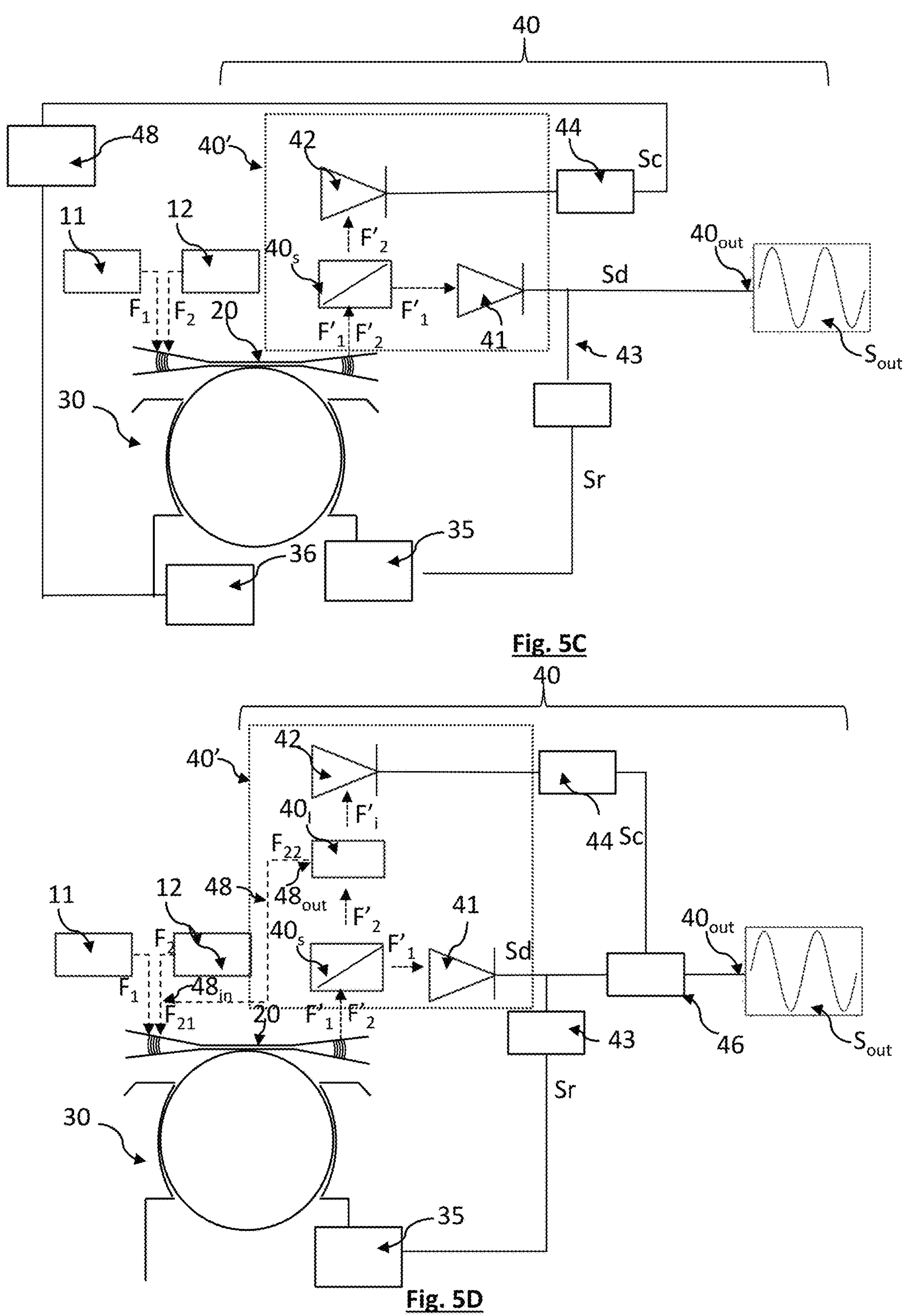

FIG. 5C schematically shows another variant of the second embodiment of the invention.

FIG. 5D schematically shows another variant of the second embodiment of the invention.

DESCRIPTION OF PARTICULAR EMBODIMENTS

Figures 1A, 1B:
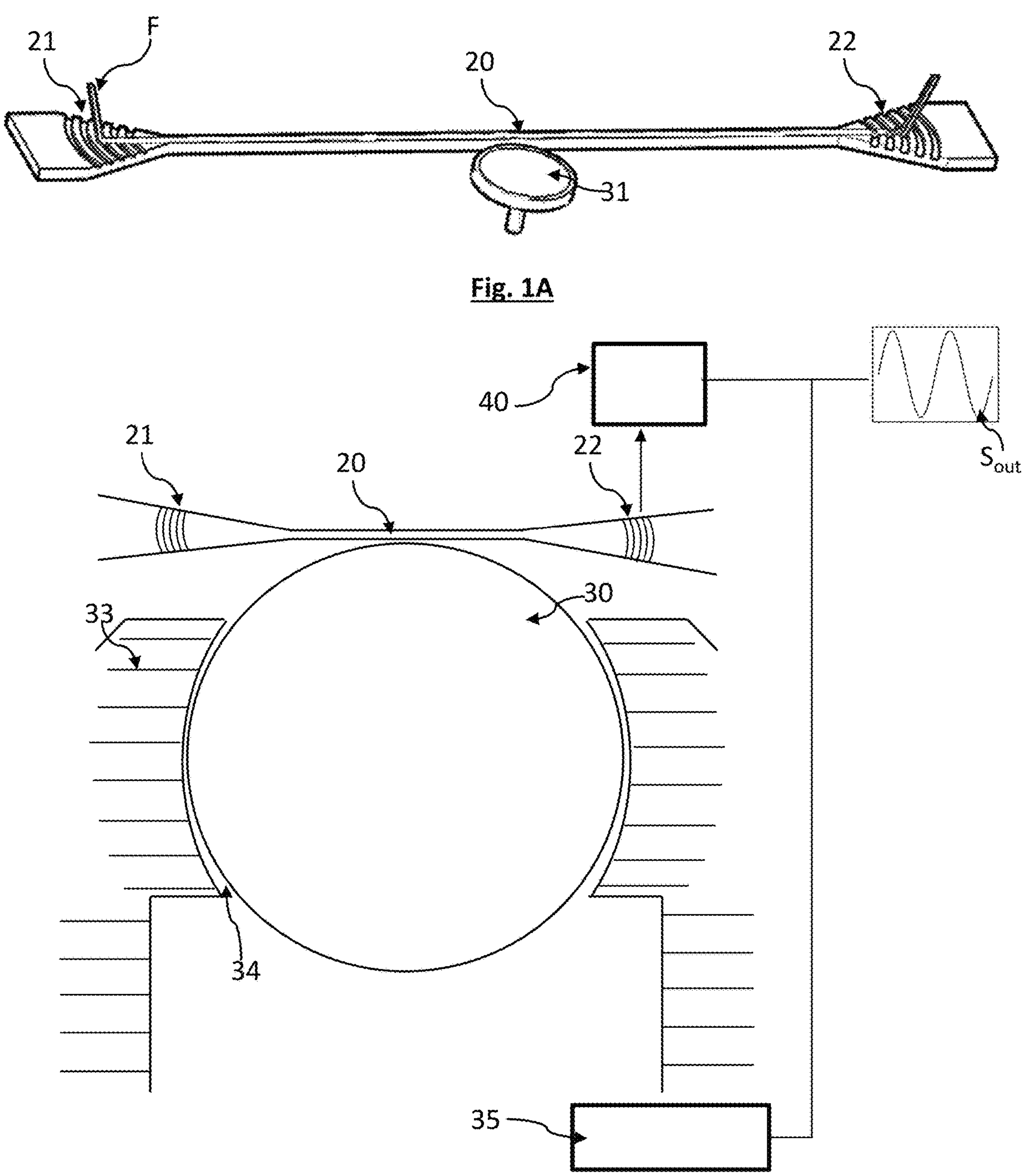

FIGS. 1A and 1B schematically show one example of an opto-mechanical oscillator. The oscillator comprises a waveguide 20 configured to guide a light beam F. The waveguide 20 extends between a first optical coupler 21 and a second optical coupler 22. The first optical coupler 21 is configured to allow a light beam, in particular a laser beam, to be admitted into the power waveguide. The light beam is produced by a laser source 10. The second optical coupler 22 is configured to allow light having propagated through the waveguide 20 to be extracted. The first and second optical couplers are diffraction gratings for example, this type of structure being known to those skilled in the art.

The oscillator comprises a resonator 30 extending along the waveguide 20, between the first coupler 21 and the second coupler 22. The resonator 30 is configured to oscillate at a resonant frequency $f_r$. The resonator 30 is, in this example, a structure capable of being animated by a planar movement, called the contour mode, at the resonant frequency, under the effect of an electrostatic actuation generated by an actuator 33. The actuator 33, shown in FIG. 1B, is fixed with respect to the resonator 30. The actuator 33 is located on either side of the resonator 30. The electrostatic actuation is applied over an air gap 34 extending between the actuator 33 and the resonator 30. The electrostatic actuation is controlled by a control unit 35.

The waveguide 20 may be produced on the surface Si layer of an SOI substrate (SOI standing for silicon-on-insulator). Its cross section may, for example, be a few hundred nm by a few hundred nm, and for example of the order of 600 nm×200 nm. By cross section, what is meant is a section in a plane perpendicular to the axis of propagation of the light through the waveguide. Preferably, the waveguide 20 is configured to allow propagation of only a single mode, at a wavelength which may be 1550 nm, which wavelength is commonly employed in the field of telecommunications.

The resonator may have a diameter of the order of 10 μm, and a thickness of the order of 220 nm. The dimension of the air gap 34 is for example of the order of 100 nm.

The resonator 30 is optically coupled to the waveguide 20, for example by evanescent coupling. The minimum distance between the resonator 30 and the waveguide 20 is for example 60 nm, and typically between 100 and 150 nm. Thus, when a light beam propagates along the waveguide 20, part of the light beam is extracted and propagates into and around the resonator 30, or in the near field around the latter.

The oscillator comprises a processing circuit 40, intended to produce an output signal $S_{out}$ that is amplitude modulated at a modulation frequency that is as stable as possible. The processing circuit comprises a feedback loop, connecting the processing circuit 40 to the control unit 35, so as to maintain the oscillation of the resonator at the resonant frequency.

Figures 2A, 2B:
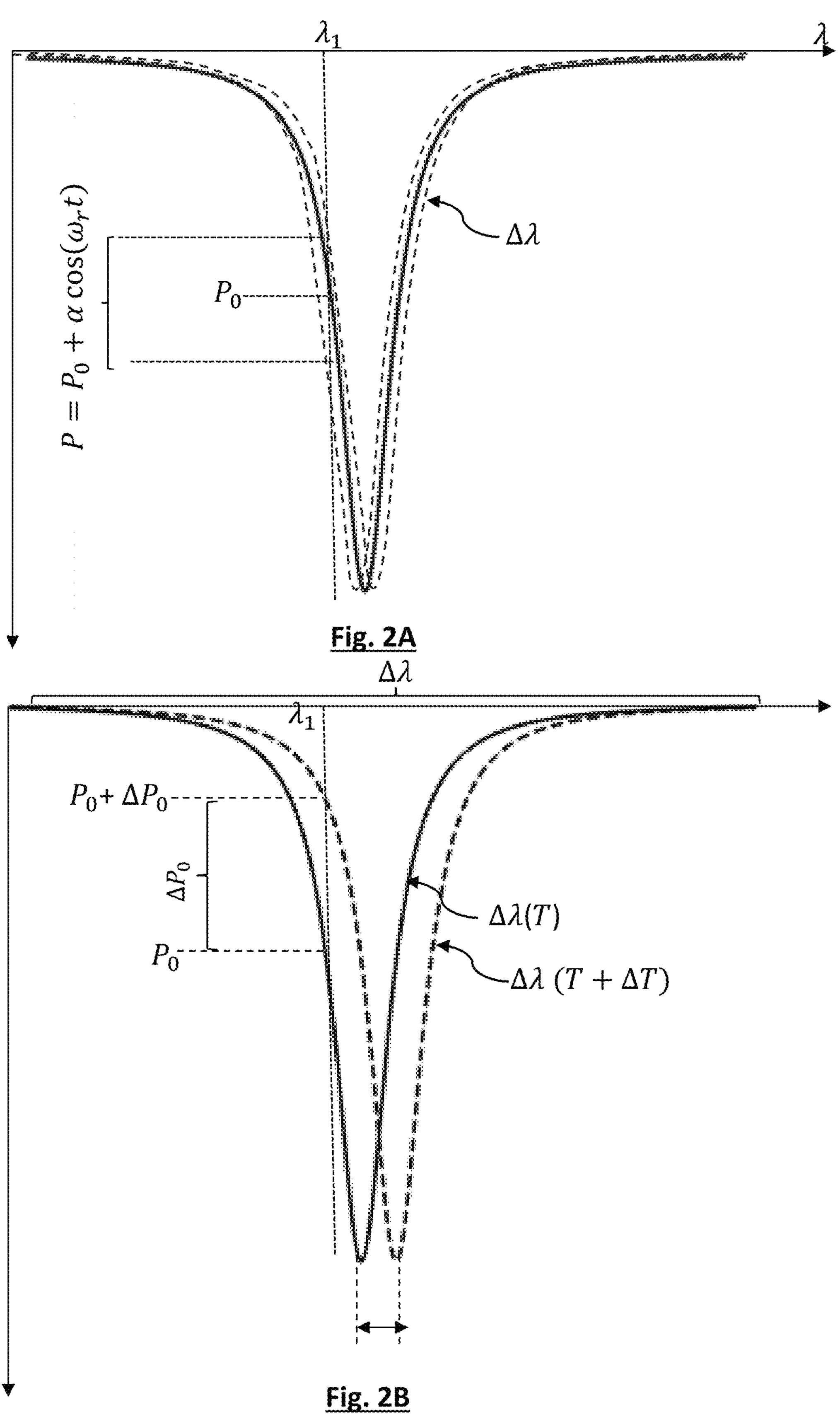
FIG. 2A illustrates the harmonic shift of the optical coupling passband, under the effect of a mechanical oscillation, generating an oscillation in the optical power delivered by the oscillator as described with reference to FIGS. 1A and 1B.
FIG. 2B illustrates an effect of a temperature variation on the optical power delivered by the mechanical oscillator.

FIG. 2A illustrates a passband of optical coupling between the waveguide 20 and the resonator 30. Below, this coupling is designated waveguide 20/resonator 30 coupling, the latter forming an optical cavity. The x-axis corresponds to the optical wavelength. The y-axis corresponds to the luminous power extracted from the waveguide 20: it represents the fraction of light collected by the resonator. The solid curve represents a configuration in which the resonator is stationary. Under the effect of the oscillation, the resonator is deformed, this resulting in a modification of the optical waveguide 20/resonator 30 coupling. In FIG. 2A, this results in a periodic shift of the coupling passband, between the two dashed curves, due to a spectral shift in the optical waveguide 20/resonator 30 coupling. The coupling passband may also widen or narrow, without the center wavelength of the passband being shifted.

In FIG. 2A, the vertical dotted line corresponds to the wavelength λ of the beam F propagating through the waveguide 20. Under the effect of the periodic variation in the coupling passband, the fraction of light optically coupled to the resonator varies. The power of the optical beam F propagating through the waveguide is then modulated at an angular frequency $\omega_r$, according to the expression:

$$P = P_0 + \alpha\cos(\omega_r t) \tag{1}$$

where:

$P_0$ corresponds to a power, called static power, propagating through the waveguide "at equilibrium", i.e. in the absence of oscillation of the resonator 30;

α corresponds to the modulation amplitude;

$$\omega_r = 2\pi f_r \tag{2}$$

Preferably, the wavelength λ corresponds to the steepest part of the curve describing the coupling passband Δλ. This allows the variation in the power extracted by the optical coupling to be maximized, with respect to the periodic spectral variation in the coupling passband.

As described in connection with the prior art, under the effect of a variation in the temperature ΔT of the resonator, the optical coupling passband varies. This results in a spectral shift of the coupling passband, as shown schematically in FIG. 2B. Thus, the power of the beam propagating through the waveguide 20 is modulated in time, according to the expression:

$$P = (P_0 + \Delta P_0) + \alpha\cos((\omega_r + \Delta\omega_r)t) \tag{3}$$

where:

$\Delta P_0$ is a shift, referred to as the static shift, in the power propagating through the waveguide, under the effect of the temperature variation;

$\Delta\omega_r$ corresponds to a shift in angular frequency expressing the frequency shift, of the power modulation, under the effect of the temperature variation ΔT.

The oscillators described below, with reference to FIGS. 3A, 3B, 3C, 3D, 5A, 5B, 5C and 5D aim to make a correction to correct the frequency shift, represented here by the shift of the angular frequency $\Delta\omega_r$.

A first embodiment of a temperature-stabilized oscillator has been shown in FIG. 3A. The oscillator 1 comprises a waveguide 20 and a resonator 30, as described with reference to FIGS. 1A and 1B. The device comprises a first laser source 11 intended to produce a first light beam $F_1$ the power of which is intended to be modulated by the resonator 30. The first laser beam $F_1$ is coupled to the waveguide 20 by the first coupler 21. The first light beam is for example emitted at a first wavelength $\lambda_1$ lying in the spectral band 1520 nm-1580 nm when the oscillator is intended for telecommunications applications.

Downstream of the resonator 30, all or part of the first laser beam $F_1$ is extracted from the waveguide 20 by the second coupler 22, so as to form an extracted beam $F'_1$. The extracted beam $F'_1$ is representative of the modulation of power applied by the resonator 30. The extracted beam $F'_1$ is passed to a processing circuit 40. As described above, the processing circuit 40 is configured to generate a periodic amplitude-modulated output signal $S_{out}$. One important aspect of the processing circuit 40 is that it is configured so that the output signal is amplitude modulated at a modulation frequency that is as stable as possible.

Whatever the embodiment, the processing circuit 40 comprises an input formed by a photodetection circuit 40'. The photodetection circuit comprises a photodetector or a plurality of photodetectors, depending on the embodiment. The processing circuit extends between the photodetection circuit 40' and an output, which delivers the output signal $S_{out}$.

The extracted beam $F'_1$ is passed to a splitter $\mathbf{40}_s$. The splitter $\mathbf{40}_s$, commonly referred to as 'power splitter', is configured to pass:

a first part $F'_{11}$ of the extracted beam $F'_1$ to a first branch, called the detection branch, which is intended to form the output signal $S_{out}$ and to form a feedback signal Sr to be fed to the control unit 35 of the resonator 30;

a second part $F'_{12}$ of the extracted beam $F'_1$ to a second branch, called the correction branch, which is intended to generate a correction signal Sc. The correction signal is representative of a variation in the first coupling spectral band as a function of the temperature variation. In this example, the correction branch comprises a second photodetector 42, a low-pass frequency filter 44 and a corrector 46.

The first part $F'_{11}$ of the extracted beam $F'_1$ is intended to generate the amplitude-modulated output signal $S_{out}$. It may represent 50% of $F'_1$. Preferably, the first part $F'_{11}$ is larger than the second part $F'_{12}$. The first part $F'_{11}$ may correspond to at least 80% or at least 90% of the beam $F'_1$, the second part $F'_{12}$ corresponding to the remainder.

In this example, the first photodetector 41 is a photodiode. The first photodetector 41 generates a detection signal Sd, of angular frequency ($\omega_r+\Delta\omega_r$), that is an image of the optical beam. Part of the detection signal Sd is passed to the control unit 35 of the resonator 30, and forms the feedback signal Sr. The feedback loop comprises a high-pass filter 43. The high-pass filter 43 is configured to extract a high-frequency component of the detection signal resulting from the first photodetector 41. By high-frequency component, what is meant is a component in a frequency range containing the resonance $f_r$ of the resonator 30.

The second photodetector 42 is for example a photodiode. The low-pass filter 44 is configured to extract a low-frequency component of the signal resulting from the second photodetector, forming the correction signal Sc. By low-frequency component, what is meant is a component strictly lower than the resonant frequency $f_r$ of the resonator 30, for example a component at a frequency lower than 100 Hz, or even 10 Hz or even 1 Hz. This makes it possible to estimate the low-frequency component, corresponding to the variation $\Delta P_0$ in the amplitude of modulation under the effect of gradual drift of the coupling passband $\Delta\lambda$ between the waveguide 20 and the resonator 30, under the effect of a gradual variation in the temperature of the resonator 30. The low-frequency component, forming the correction signal Sc, is representative of the variation $\Delta P_0$ in optical power. It depends on the temperature variation dT of the resonator.

The processing circuit 40 is configured to extract the correction signal Sc resulting from the low-pass filter 44, and to correct, on the basis of the correction signal, the detection signal Sd propagating downstream of the first photodetector 41. To this end, the processing circuit comprises a correction component 46, which is fed by:

- the correction signal Sc resulting from the low-pass filter 44;
- the detection signal Sd resulting from the photodetector 41, on the basis of which the processing circuit forms the output signal $S_{out}$.

The correction component 46 takes into account a pre-established transfer function h relating the low-frequency drift, corresponding to the variation in the static power $\Delta P_0$, under the effect of temperature, to the high-frequency drift, corresponding to the variation in the modulation frequency. The correction component may comprise a digital part, allowing $\Delta\omega_r$ to be estimated and taken into account to correct the angular frequency of the detection signal.

The transfer function makes it possible to estimate $\Delta\omega_r$ as a function of $\Delta P_0$: $\Delta\omega_r=h(Sc)$ bearing in mind that the correction signal Sc corresponds to $\Delta P_0$: the correction signal Sc is representative of the temperature variation of $\Delta P_0$.

For example, it is possible to make the simplifying assumption that the frequency drifts linearly with temperature: $\Delta\omega_r=\gamma\Delta T$ where $\gamma$ is a known positive coefficient. The coefficient $\gamma$ may be determined by modelling and/or experimentally. It is also assumed that the variation in optical power $\Delta P_0$ is also a linear function of temperature: $\Delta P_0=\beta\Delta T$. $\beta$ is a known positive coefficient. The coefficient $\beta$ may be determined by modelling and/or experimentally.

Thus, $$\Delta\omega_r=\gamma\frac{\Delta P_0}{\beta}.$$

This reasoning may be generalized to non-linear dependencies of frequency and of the variation in optical power on temperature. For example, if $\Delta\omega_r=g_1(\Delta T)$ and $\Delta P_0=g_2(\Delta T)$, $\Delta\omega_r=g_1(g_2^{-1}(\Delta P_0)=h(\Delta P_0)$. The functions $g_1$ and $g_2$ are established experimentally and/or by modelling. $h=g_1\cdot g_2^{-1}$ Thus, the corrector 46 is configured to estimate $\Delta\omega_r$, on the basis of Sc, and to correct the modulation frequency of the detection signal sd depending on $\Delta\omega_r$. An amplitude-modulated output signal $S_{out}$ stabilized to the angular frequency $\omega_r$ is thus obtained.

One advantage of the oscillator described with reference to FIG. 3A is that the output signal is corrected on the basis of the light beam which has been amplitude modulated by the resonator 30. This makes it possible to better take account of the temperature variation, compared to a correction based on an external measurement of temperature. This advantage is also obtained with the other configurations described below.

FIG. 3B shows one variant of the oscillator described with reference to FIG. 3A. The processing circuit 40 comprises a correction branch, similar to the one illustrated in FIG. 3A. The processing circuit 40 comprises the photodetector 41 and the high-pass filter 43 described with reference to FIG. 3A, forming the detection branch. One particularity of this variant is that the low-frequency component that forms the correction signal Sc is not used to estimate the drift of the modulation frequency directly, but rather is fed to a correction component 48, the latter being configured to modulate the power supply of the laser 11. Thus, the power of the laser may be reduced, as temperature increases, so as to cause a decrease in temperature. The correction signal Sc is used as feedback to control the power supply of the laser 11.

FIG. 3C shows one variant of the oscillator described with reference to FIG. 3B. According to this variant, the processing circuit 40 comprises a correction branch, similar to the one illustrated in FIG. 3A. The processing circuit 40 comprises the photodetector 41 and the high-pass filter 43 described with reference to FIG. 3A, forming the detection branch. The correction signal Sc is used as feedback to control the resonator 30, via the corrector 48, which acts on a regulation unit 36. The regulation unit 36 may comprise a resistor, making it possible to modulate the temperature in proximity to the resonator, or an electrode facing the air gap 34, so as to modulate the rigidity of the resonator 30 via electrostatic tuning. In this variant, the correction signal Sc is configured to be fed back directly to the resonator 30.

FIG. 3D shows one variant of the configuration described with reference to FIG. 3A, in which the photodetection circuit 40' comprises a single photodetector 41, feeding both the correction branch, which comprises the low-pass filter 44 connected to the corrector 46, and the detection branch, which carries the detection signal intended to form the output signal. It will be noted that the configurations described with reference to FIGS. 3B and 3C are able to use a photodetection circuit 40' comprising only a single photodetector.

FIG. 4 illustrates a coupling spectral band $\Delta\lambda$ containing a succession of various elementary pass bands that do not overlap. A first wavelength $\lambda_1$ in a first passband 411 and a second first wavelength $\lambda_2$ in a second passband $\Delta\lambda_2$ have been shown. In FIG. 4, each slope has been represented by a double-headed arrow.

FIGS. 5A to 5D relate to an embodiment in which the oscillator comprises two different light sources: a first light source 11, as described above, and a second light source 12, emitting a second beam $F_2$, preferably a laser beam, at a second wavelength $\lambda_2$, different from the first wavelength $\lambda_1$, as described with reference to FIG. 4. Thus, a fluctuation in the coupling passband at one wavelength may be used to determine the fluctuation in the coupling spectral band at the other wavelength.

The second wavelength is sufficiently offset from the first wavelength such that the two wavelengths may be split spectrally by a conventional spectral splitter. For example, the spectral offset is greater than 1 nm and less than 100 nm. The spectral offset is preferably small enough to allow coupling to the waveguide 20 with the first coupler and extraction to the processing circuit 40 by means of the second coupler.

In the examples shown in FIGS. 5A to 5D, the beams $F_1$ and $F_2$ are introduced into the waveguide 20 via the first coupler 21. They are extracted from the waveguide via the second coupler 22. According to other possibilities:

- two first couplers 21 are provided, one addressing the first beam $F_1$ and the other addressing the second beam $F_2$;
- and/or two second couplers 22 are provided, allowing separate extraction of the first beam $F_1$ and of the second beam $F_2$.

The second laser beam $F_2$ acts as a probe beam. Thus, the optical power $P_2$ of the second beam $F_2$ is preferably less than the optical power $P_1$ of the first beam $F_1$. It is possible for $P_2 \leq 0.5\ P_1$ or indeed for $P_2 \leq 0.01\ P_1$. It is preferable for the probe beam to be of low intensity to avoid self-heating effects. The beam $F_1$ is of high power, so as to be able to generate a larger amplitude modulation.

Under the effect of a temperature variation, the power of the second beam propagating through the waveguide is modulated in time, according to the expression:

$$P' = (P'_0 + \Delta P'_0) + \alpha\cos((\omega_r + \Delta\omega_r)t) \tag{3'}$$

where

- $\Delta P'_0$, is a static shift in the power propagating through the waveguide, under the effect of the temperature variation;
- $\Delta\omega_r$ corresponds to the shift in angular frequency expressing the frequency shift, of the power modulation, under the effect of the temperature variation.

The embodiment illustrated in FIGS. 5A to 5D is based on extraction of the first beam $F_1$, to form a first extracted beam $F'_1$, and a second extraction of the second beam $F_2$, to form a second extracted beam $F'_2$. The extracted second beam $F'_2$ is intended to measure the low-frequency drift $\Delta P'_0$ of the modulation of the second optical beam, so as to estimate the temperature variation. The first extracted beam $F'_1$ is intended to form a detection signal Sd, the latter being used as feedback to control the resonator 30 and to form the output signal $S_{out}$.

In the examples described in FIGS. 5A to 5D, the first and second beams are extracted via the same second coupler 22 and the photodetection circuit 40' comprises two photodetectors 41 and 42. The processing circuit 40 comprises a splitter $\mathbf{40}_s$ configured to allow spectral splitting of the extracted beams $F'_1$ and $F'_2$. The extracted beam $F'_1$, at the wavelength $\lambda_1$, is passed to the first photodetector 41 of the processing circuit 40. The extracted beam $F'_2$, at the wavelength $\lambda_2$, is passed to the second photodetector 42 of the processing circuit.

Just as in the embodiments shown in FIGS. 3A to 3C, the processing circuit advantageously comprises a high-pass filter 43 placed in the feedback loop feeding the resonator 30.

The processing circuit 40 comprises a second photodetector 42, a photodiode for example, connected to a low-pass filter 44. The low-pass filter 44 is intended to extract a low-frequency component of the signal resulting from the photodetector 42, which component is considered representative of the variation $\Delta P'_0$ in optical power, and forms the correction signal Sc.

In the embodiment shown in FIG. 5A, the processing circuit comprises a correction component 46, which is fed by:

- the correction signal Sc resulting from the low-pass filter 44: the correction signal corresponds to the variation in static power in the second spectral band. Thus, the signal is representative of a variation in the temperature of the resonator;
- the detection signal Sd resulting from the photodetector 41.

The correction component 46 takes into account a pre-established response function h' relating the low-frequency drift, corresponding to the variation in the static power-$\Delta P'_0$ of the second beam, under the effect of temperature, to the high-frequency drift, corresponding to the variation in the modulation frequency.

The response function makes it possible to estimate $\Delta\omega_r$ as a function of $\Delta P'_0$: $\Delta\omega_r = h'(Sc)$, bearing in mind that Sc corresponds to $\Delta P'_0$, which is representative of $\Delta T$.

Thus, the corrector 46 is configured to estimate $\Delta\omega_r$, on the basis of the correction signal Sc, and to correct the modulation frequency of the detection signal Sd depending on $\Delta\omega_r$. An amplitude-modulated output signal stabilized to the angular frequency $\omega_r$ is thus obtained.

FIG. 5B shows one variant of the oscillator described with reference to FIG. 5A. The processing circuit 40 comprises a photodetector 42 and a low-pass filter 44, as illustrated in FIG. 5A, generating a correction signal Sc. The processing circuit comprises the photodetector 41 and the high-pass filter 43 described with reference to FIG. 5A. The correction signal Sc is not used directly to estimate the drift of the modulation frequency, but to modulate the power supply of the laser 11, via a correction component 48 regulating said power supply. Thus, the power of the laser may be reduced, as temperature increases, so as to achieve temperature regulation.

FIG. 5C shows one variant of the oscillator described with reference to FIG. 5B. According to this variant, the processing circuit 40 comprises a photodetector 42 and a low-pass filter 44, similar to those illustrated in FIG. 5A. The processing circuit 40 comprises the photodetector 41 and the high-pass filter 43 described with reference to FIG. 5A. The correction signal Sc is used as feedback to control the resonator 30, as described with reference to FIG. 3C. The correction signal is addressed, via a correction component, to a regulating unit 36, for example a resistor, making it possible to modulate the temperature in proximity to the resonator, or an electrode facing the air gap, so as to modulate the rigidity of the resonator 30 via electrostatic tuning. In this variant, the correction signal is configured to be fed back directly to the resonator 30.

FIG. 5D shows one variant of the embodiment described with reference to FIG. 5C. In FIG. 5D, the electronic analysis circuit 40 comprises an interferometer 40*i* configured to allow interference between:

- part of the beam F2, sampled between the second light source 12 and the waveguide 20;
- the beam F'2 extracted from the waveguide 20.

The beams $F_2$ and $F'_2$ are at the same wavelength $\lambda_2$. They are combined in the interferometer $\mathbf{40}_i$ so as to form an interference signal $F'_i$. The latter is passed to the low-frequency branch of the processing circuit. The interference signal $F'_i$ is representative of a phase shift between the beams $F_2$ and $F'_2$. A measurement of a phase variation is considered to be more sensitive than a measurement of a power variation.

Use of an interferometer 40$_i$, as illustrated in FIG. 5D, is compatible with the embodiments illustrated in FIGS. 5A to 5C.

The invention makes it possible to generate an output signal $S_{out}$ that is amplitude modulated, at a stabilized frequency. It is particularly suitable for formation of a clock signal, intended for electronic circuits.

The invention claimed is:

1. An optomechanical oscillator, comprising:

a first laser light source, emitting a first light beam at a first wavelength;

a resonator configured to oscillate at a resonant frequency, the resonator being configured to be optically coupled to the first light beam, in a first coupling passband containing the first wavelength, so that the resonator collects a fraction of the light propagating in the first beam, said fraction of light being modulated at the resonant frequency;

a processing circuit, configured to:

receive, as input, the first light beam having propagated along the resonator;

generate a feedback signal intended to be fed to the resonator;

form, by way of output, an output signal that is amplitude modulated, at a modulation frequency corresponding to the resonant frequency;

wherein the processing circuit comprises:

a photodetection circuit, forming the input of the processing circuit, and configured to detect at least a first part of the first light beam so as to form a detection signal that is frequency modulated at the resonant frequency, the processing circuit being configured to form the output signal depending on the detection signal;

a low-pass filter, connected to the photodetection circuit and configured to form a correction signal, at a frequency lower than the resonant frequency, the correction signal being representative of a temperature variation of the resonator;

a corrector, connected to the low-pass filter and configured to correct the modulation frequency of the detection signal depending on the correction signal.

2. The oscillator according to claim 1, wherein the photodetection circuit comprises a first photodetector, connected to:

a detection branch, carrying the detection signal;

a correction branch, comprising the low-pass filter and the corrector.

3. The oscillator according to claim 1, wherein the photodetection circuit comprises:

a first photodetector, opening onto a detection branch carrying the detection signal;

a second photodetector, opening onto a correction branch, the correction branch comprising the low-pass filter and the corrector.

4. The oscillator according to claim 1, wherein the corrector is configured to apply the correction signal:

to the detection signal resulting from a first photodetector;

or to the resonator;

or to the first light source.

5. The oscillator according to claim 4, wherein the corrector is further configured to:

estimate a variation in the resonant frequency as a function of the correction signal;

correct a frequency of the detection signal resulting from the first photodetector, depending on the variation of an estimated resonant frequency.

6. The oscillator according to claim 5, wherein the corrector is configured to apply a response function to the correction signal, to estimate the variation in resonant frequency.

7. The oscillator according to claim 4, wherein the corrector is connected to the first laser light source, so as to modify an emission power of the first light beam depending on the correction signal.

8. The oscillator according to claim 4, wherein the corrector is connected to the resonator, so as to modify the resonant frequency depending on the correction signal.

9. The oscillator according to claim 8, wherein the resonator comprises a regulating unit configured to be fed by the corrector, so as to adjust the resonant frequency via a thermal or electrostatic effect.

10. The oscillator according to claim 1, wherein the photodetection circuit comprises:

a first photodetector, opening onto a detection branch carrying the detection signal;

a second photodetector, opening onto a correction branch, the correction branch comprising the low-pass filter and the corrector;

wherein the second photodetector is configured to detect a second part of the first light beam.

11. The oscillator according to claim 1, comprising a waveguide configured to receive the first light beam and to propagate said first light beam along the resonator to the processing circuit.

12. The oscillator according to claim 1, comprising:

a second laser light source, emitting a second light beam at a second wavelength, different from the first wavelength, wherein:

the processing circuit is configured to receive the second light beam propagating along the resonator;

the second wavelength lies in a second coupling passband of the resonator, so that the resonator collects a fraction of the light propagating in the second beam, said fraction of light being modulated at the resonant frequency;

a second photodetector is configured to detect all or part of the second light beam having propagated along the resonator, so that the correction signal is established on the basis of a low-frequency component of the second light beam.

13. The oscillator according to claim 12, wherein the processing circuit comprises a splitter, configured to:

direct all or part of the first beam to a first photodetector;

direct all or part of the second beam to the second photodetector.

14. The oscillator according to claim 12, comprising:

an optical channel, extending between the second light source and the processing circuit, the optical channel being configured to convey part of the second light beam from the light source to the processing circuit;

an interferometer, configured to form an interference signal between:

the second beam having propagated along the resonator;

the part of the second light beam emerging from the optical channel;

wherein the second photodetector is configured to detect the interference signal resulting from the interferometer.

15. The oscillator according to claim 12, wherein:

the oscillator comprises a waveguide configured to receive the first light beam and to propagate said first light beam along the resonator to the processing circuit;

wherein the waveguide is configured to receive the second light beam and to propagate the latter along the resonator, to the processing circuit.

16. The oscillator according to claim 1, comprising a high-pass filter, placed between a first photodetector and the resonator, and a cut-off frequency of which is lower than or equal to the resonant frequency.

* * * * *